United States Patent [19]

Haag et al.

[11] Patent Number: 4,495,599

[45] Date of Patent: Jan. 22, 1985

[54] LOGIC STATE ANALYZER WITH SEQUENTIAL TRIGGERING AND RESTART

[75] Inventors: George A. Haag, Colorado Springs; O. Douglas Fogg, Loveland; Gordon A. Greenley; Steve A. Shepard, both of Colorado Springs, all of Colo.; F. Duncan Terry, Meridan, Id.

[73] Assignee: Hewlett-Packard Company, Palo Alto, Calif.

[21] Appl. No.: 456,155

[22] Filed: Jan. 6, 1983

Related U.S. Application Data

[60] Division of Ser. No. 210,462, Nov. 25, 1980, Pat. No. 4,373,193, said Ser. No. 210,462, is a continuation of Ser. No. 75,787, Sep. 17, 1979, abandoned, said Ser. No. 75,787, Division of Ser. No. 828,138.

[51] Int. Cl.$^3$ .......................... G06F 3/05; G06F 3/153
[52] U.S. Cl. ................................................. 364/900
[58] Field of Search ... 364/900 MS File, 200 MS File, 364/900, 200; 370/48, 94; 382/1, 14, 40

[56] References Cited

U.S. PATENT DOCUMENTS

| | | | |
|---|---|---|---|
| 3,351,917 | 11/1967 | Shimabukuro | 364/900 |
| 3,406,387 | 10/1968 | Werme | 364/900 |
| 3,457,552 | 7/1969 | Asendorf | 382/14 |
| 3,835,455 | 7/1974 | Abbenante | 364/900 |
| 4,040,025 | 3/1976 | Morrill, Jr. | 364/900 |
| 4,100,532 | 11/1976 | Farnbach | 382/1 |
| 4,192,966 | 3/1980 | Mayer | 382/40 |

OTHER PUBLICATIONS

Operating and Service Manual, 1600A, Logic State Analyzer–Hewlett Packard–Jun.–1980–Part No. 01600-90910.
Service Manual–1611A–Logic State Analyzer–Hewlett Packard–Jul., 1980–Part No. 01611-90909.
Operating and Service Manual Supplement–16-11A–OPT A68, Hewlett Packard–Part No. 10257-90907.
Operating and Service Manual Supplement–1611 A–OPT A80, Hewett Packard–Part No. 10258-90905.

*Primary Examiner*—Harvey E. Springborn
*Attorney, Agent, or Firm*—Edward L. Miller

[57] ABSTRACT

A logic state analyzer monitors an ongoing succession of logic states occurring in a collection of n-many digital signals, and stores in a memory a set of logic states selected from the ongoing succession. A logic state is any one of the $2^n - 1$ possible patterns the n-many digital signals may exhibit. The memory is of some convenient fixed number of locations, and once the memory is filled the oldest stored logic states are overwritten as the newest logic states are stored. Various storage qualification criteria may be specified, in which case an individual logic state is not stored unless it meets those criteria. Upon recognition of a specified trigger condition in the succession of logic states the logic state analyzer stores an operator selectable number of additional logic states, after which the monitoring and storing of logic states ceases and the stored contents of the memory are displayed. The trigger condition may be the detection of a designated sequence of selected logic states. A sequence detector monitors the ongoing succession of logic states. To satisfy the sequence and thus meet the trigger condition the first logic state in the sequence must occur and be subsequently followed by the next logic state in the sequence, and so on, until all selected logic states in the designated sequence have occurred. It may also be required that each logic state in the sequence be detected a selected number of times before an occurrence of the next logic state in the sequence can contribute toward satisfaction of the sequence. A logic state may be designated as a restart state whose occurrence nullifies any partial satisfaction of the sequence and causes the process of sequence satisfaction to begin afresh.

8 Claims, 16 Drawing Figures

```
--------FORMAT SPECIFICATION---------TRACE-COMPLETE---------------------
```

CLOCK SLOPE [+]
(+,-)

| | POD PROBE | POD4 7-----0 | POD3 7-----0 | POD2 7-----0 | POD1 7-----0 |
|---|---|---|---|---|---|
| LABEL ASSIGNMENT (A,B,C,D,E,F,X) | | [AAAAAAAA] | [AAAAAAAA] | [DDDDDDDD] | [XXXXXXXF] |

ACTIVE CHANNELS

| | A | D | F | |
|---|---|---|---|---|
| LABEL LOGIC POLARITY (+,-) | [+] | [+] | [+] | ☐ DESIGNATES A SELECTABLE ENTRY FIELD |
| NUMERICAL BASE (BIN,OCT,DEC,HEX) | [HEX] | [HEX] | [BIN] | |

FIGURE 1

```
--------TRACE SPECIFICATION---------TRACE-COMPLETE---------------------
```

| | LABEL BASE | A HEX | D HEX | F BIN | OCCUR DEC |
|---|---|---|---|---|---|
| FIND IN SEQUENCE | | 03CF | XX | X | 00002 |
| THEN | | 03E2 | XX | X | 00003 |
| THEN | | 00E1 | XX | X | 00001 |
| [START] TRACE | | 03E3 | XX | X | 00001 |
| SEQ RESTART [ON] | | 03E4 | XX | X | |

TRACE
[ONLY STATE]    03E1   XX   X    00001

COUNT [STATE]   03E1   XX   X

FIGURE 2

```
---------TRACE LIST---------TRACE-COMPLETE---------------------
```

| LABEL BASE | A HEX | D HEX | F HEX | STATE COUNT DEC [REL] |
|---|---|---|---|---|
| SEQUENCE | 03CF | 5D | 0 | |
| SEQUENCE | 03E2 | A2 | 0 | 2 |
| SEQUENCE | 00E1 | C6 | 0 | 3 |
| START | 03E3 | 82 | 0 | 1 |
| +01 | 03E3 | E1 | 0 | 1 |
| +02 | 03E3 | E5 | 0 | 1 |
| +03 | 03E4 | 82 | 0 | 1 |
| +04 | 03E4 | 03 | 0 | 1 |
| +05 | 03E4 | 47 | 0 | 1 |
| +06 | 03E1 | A2 | 0 | 1 |
| +07 | 03E1 | 1D | 0 | 1 |
| +08 | 03E1 | 5D | 0 | 1 |
| +09 | 03CE | 5D | 0 | 1 |
| +10 | 03CE | 44 | 0 | 1 |
| +11 | 03E2 | A2 | 0 | 1 |
| +12 | 03E2 | C2 | 0 | 1 |
| +13 | 03E2 | C6 | 0 | 1 |
| +14 | 00E1 | C6 | 0 | 1 |
| +15 | 03E3 | 82 | 0 | 1 |
| +16 | 03E3 | E1 | 0 | 1 |

FIGURE 3

```
----------TRACE COMPARE------------COMPARED TRACE-COMPLETE------------
       LABEL     A      D     F    COMPARED
        BASE    HEX    HEX   BIN   TRACE MODE
                                     [STOP]
     SEQUENCE...0000...00....0...
     SEQUENCE...0000   00    0
     SEQUENCE   0000   00    0
        START   0000   00    0
         +01 ...0000...00....0...
         +02    0000   00    0
         +03    0000   00    0
         +04    0000   00    0
         +05 ...0000...00....0...
         +06    0000   00    0
         +07    0000   00    0
         +08    0000   00    0
         +09 ...0000...00....0...
         +10    0000   00    0
         +11    0000   00    0
         +12    0000   00    0
         +13 ...0000...00....0...
         +14    0000   00    0
         +15    0000   00    0
         +16    0000   00    0
```

LOGIC STATE ANALYZER WITH SEQUENTIAL TRIGGERING AND RESTART

REFERENCES TO RELATED APPLICATIONS

This application is a division of an earlier filed copending application Ser. No. 210,462, filed on Nov. 25, 1980 by George A. Haag, et al., amended to be entitled LOGIC STATE ANALYZER WITH STORAGE QUALIFICATION, and now issued as of Feb. 8, 1983 as U.S. Pat. No. 4,373,193. That application was a continuation of application Ser. No. 075,787 entitled LOGIC STATE ANALYZER filed Sept. 17, 1979 by the same inventors, and which is now abandoned. That application was in turn a division of a now abandoned application of the same inventors and title, Ser. No. 828,138, filed on Aug. 29, 1977. Each of the above patents and applications is assigned to Hewlett-Packard Co., as is the present application.

The subject matter of the present application is also related to the subject disclosed in U.S. Pat. No. 4,040,025, issued to Justin S. Morrill, Jr., on Aug. 2, 1977, and which was filed on Mar. 31, 1976. U.S. Pat. No. 4,040,025 is assigned to Hewlett-Packard Co.

The subject matter of the present application is also related to the subject disclosed in U.S. Pat. No. 4,100,532, issued to William A. Farnbach on July 11, 1978, and which was filed on Nov. 19, 1976. U.S. Pat. No. 4,100,532 is assigned to Hewlett-Packard Co.

U.S. Pat. Nos. 4,040,025 and 4,100,532 to Morrill, et al. and Farnbach, respectively, are hereby expressly incorporated by reference.

BACKGROUND AND SUMMARY

Logic state analyzers are used to monitor and record sequences of states that occur in a collection of digital signals in a system under test. A "state" is simply any one of the $2^n$ logical patterns that n-many digital signals may experience. A sequence of addresses or a sequence of fetched instructions are examples of electrical activity describable as states in a microprocessing environment and that can be monitored by a logic state analyzer to record their "state flow."

To monitor the ongoing sequence of states in a system under test a logic state analyzer samples the electrical values of the signals of interest at times determined by one or more clock signals associated with the system under test. The sampled electrical values obtained are compared to thresholds of selected value and polarity to determine their logical values, each of which will be either true or false, one or zero. Each resulting collection of ones and zeros for a sample is a state in the ongoing sequence of states. It is also simply a binary value that may be stored in a memory. A series of such stored values is a record of the activity occurring in the system under test. Such a record may be termed a trace.

To store an indefinitely long record or trace of such activity would require a corresponding indefinitely large memory. This is impractical for at least two reasons. First, the cost of huge memories is prohibitive. Second, and more to the point, no human being using a logic state analyzer has time to sort through several hundred thousand stored states, or even a few tens of thousands, to find the data that is meaningful for the problem under investigation. Yet this could easily be required if it were necessary to trace an entire high level transaction such as finding the tangent of an angle, or reading a file from a mass storage peripheral. What are needed are ways to reduce the amount of trace data stored to manageable proportions while ensuring that the information in the trace is most likely to be pertinent to the investigation at hand.

Accordingly, logic state analyzers are typically equipped with sufficient memory to store traces that range from a few hundred to a few thousand states. The memories are used circularly. That is, the newest data to be stored is written in the memory location currently containing the oldest data. The size of the memory is then the size of the trace, which then always reflects the last "memory's worth" of activity occurring to that time.

The storage of state data into the memory halts subsequent to the detection of some specified condition in the incoming state data. That condition is called the trigger condition, or simply the trigger. If the storage of state data halts immediately upon the detection of the trigger the trace then represents the activity that preceded the trigger. This can be called an "end-on" trigger. If the storage of state data were instead to continue for one additional "memory's worth" of state data the trace would then represent the activity that occurred after the trigger. This can be called a "start-on" trigger. Typically, the user specifies some number of additional storage operations that is less than one memory's worth, e.g., half that number of locations. This produces a "center-on" trigger. A "center-on" or any other "middle of trace" trigger produces a trace that records both what states led up to the trigger, as well as those that followed it.

One of the ways to help ensure that the trace contains principally the data that is most likely to be pertinent to the investigation at hand is to allow the trigger to represent a condition more sophisticated than simply any occurrence of a specified state. A sequential trigger, for instance, produces a trigger only when a predefined sequence of states has already occurred previous to the trigger state. In terms of a flow chart for the state flow of the system under test, the user can use a sequential trigger to say "trigger when it gets there by going that way." That is, simply getting "there" is not sufficient to create a trigger; getting "there" must also be preceded, in order, by certain other events (states) that represent "going that way." For example, the trigger may be desired upon fetching an instruction from the first address in a complement routine, but only if that routine is called in the context of floating point division, not for floating point subtraction, etc. Thus, sequential triggering allows the user to specify a trigger condition that is not simply a mere place on a flow chart, but is one that has historical criteria associated with it as well.

Sequential triggering is accomplished by equipping a logic state analyzer with a mechanism to allow the user to define a sequence of states to precede a designated trigger state and a sequence detection mechanism to issue an appropriate internal trigger signal upon detection of the trigger state subsequent to the satisfaction of the sequence.

It may also be convenient to equip a logic state analyzer having a sequential trigger with a restart capability. This useful feature allows the detection of a specified state to cancel the progress made to that time toward satisfaction of the sequence, requiring satisfaction to begin afresh.

DESCRIPTION OF THE FIGURES

FIG. 1 illustrates the interactive format specification display.

FIG. 2 illustrates the interactive trace specification display.

FIG. 3 illustrates a trace list display of the stored data states.

FORMAT SPECIFICATION

Data formatting permits the partitioning of 32 input data channels into parameters of interest. Contiguous data channels which behave as a single parameter may be assigned to one of six labels (A-F). For example, in FIG. 1, illustrating the interactive format specification display, 16 bits of an address bus have been assigned to label "A", 8 bits of a data bus have been assigned to label "D", 1 bit of data on pod 1 has been assigned to label "F", and 7 bits have been left unassigned (labeled "X"). Further specifications and data manipulations are made by referencing these labels. Each assigned label may be independently declared to have a positive or negative "logic polarity" and converted to an independently selected radix which can be binary, octal, decimal or hexedecimal. Further, the slope of the positive or negative clock transition at which time the input data channels are sampled can be selected ("clock slope").

Figure 15:
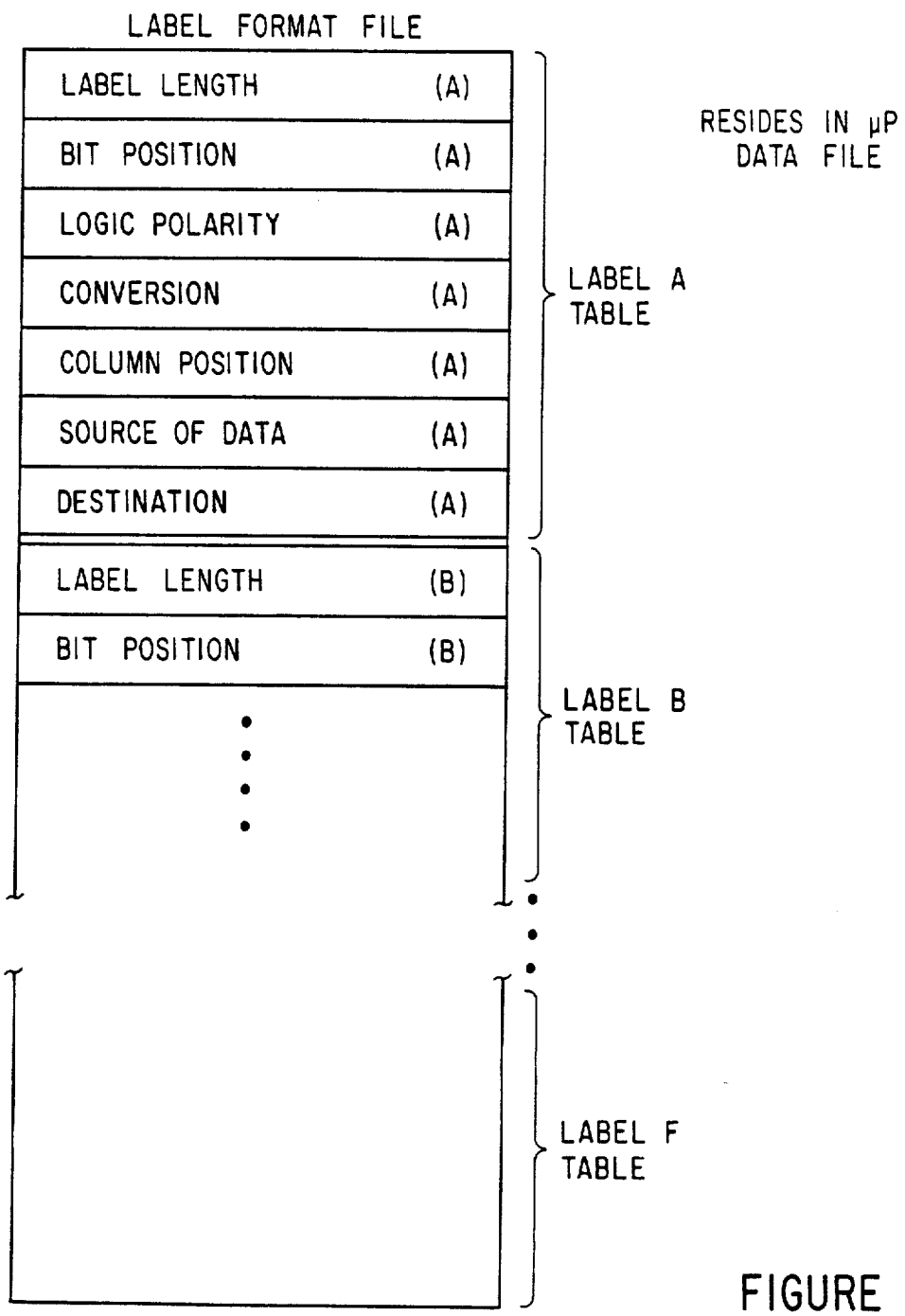
FIG. 15 illustrates the format of the label format file.
Figure 16:
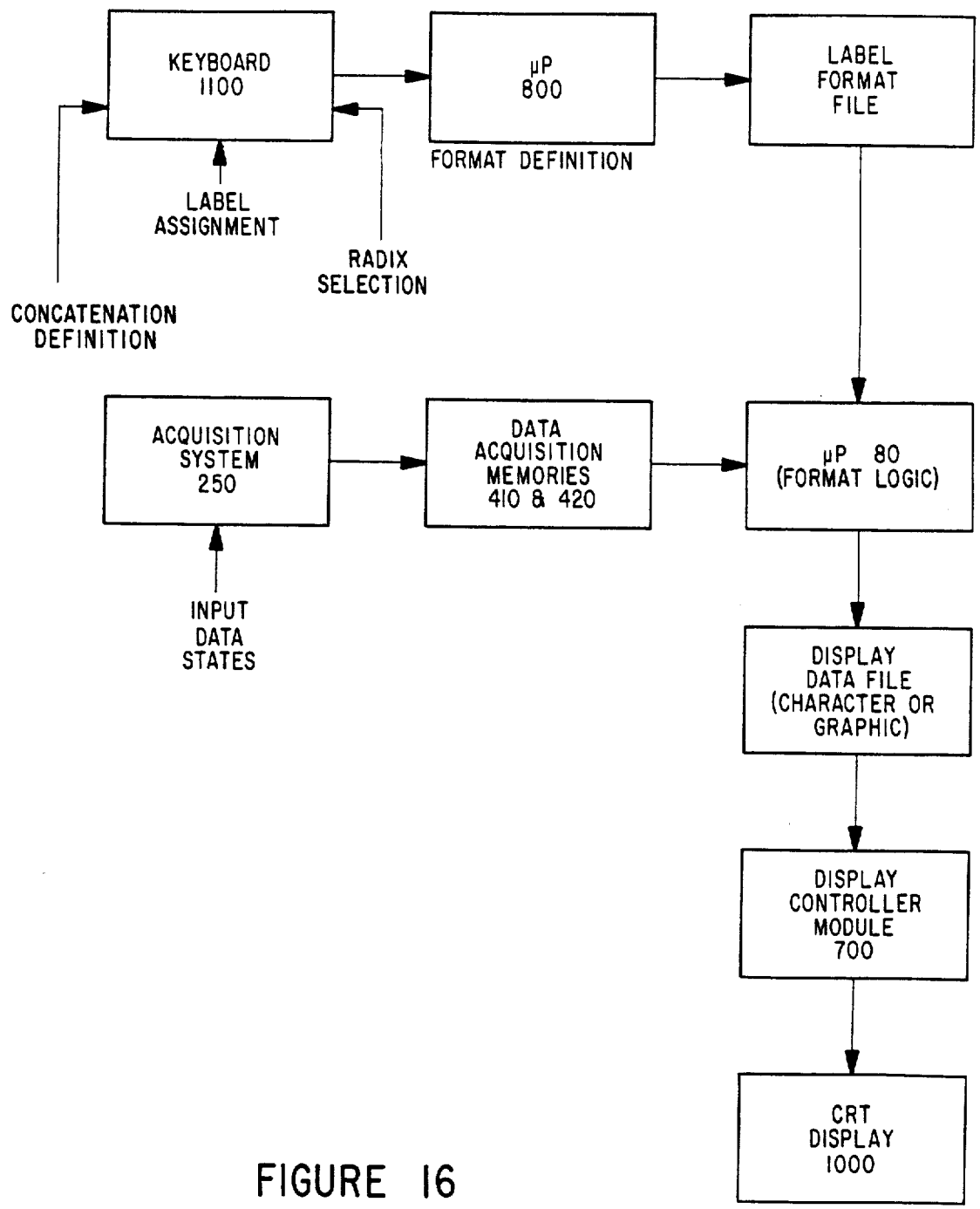
FIG. 16 illustrates the logic flow of the display formatting logic.

Keyboard entries to the microprocessor 800, as shown in FIG. 16, permit the construction of the lebel format file, shown in more detail in FIG. 15 which, contains the format specification parameters. This is used to process the stored data states in the construction of the alphabetically concatenated ASCII display data file and the graphic display data file. Either of the display data files is subsequently selected and used for display purposes by the display control module 700 and the CRT display 1000.

TRACE SPECIFICATION

The assigned input data channels are sampled at the specified clock transitions and are treated as one sampled state. The trace specification defines which of the sampled states are to be stored for display and which sampled states are to be counted for count measurements. The trace specification comprises a definition of state conditions specifying the trace position, the selective trace, and the count measurement. Each state condition defines a state of the assigned input data channels in any combination of 1's, 0's, and/or X's (don't care). In octal, decimal or hexedecimal bases the definition is defined in terms of the appropriate alphamumerics and X's.

A trace position may be selected to a start, center or end the selective trace in response to the input data satisfying a predefined state sequence. In this description it will be assumed that the trace position starts the selective trace. A state sequence of up to seven state conditions must be satisfied in a specified order, ignoring intermediate states which do not satisfy the state sequence. The simplest state sequence is a single state condition. Specific segments of branched, looped or nested forms of state flow may be directly located by properly defined state sequences. In addition, each state condition in a state sequence may be required to occur from 1 to 65536 times before the state condition is satisfied. This form of positioning will locate the nth pass of a loop beginning at a given state condition. Clock delay may be incorporated by defining the nth occurrence of any state (an all don't care state specification). The trace logic may also be specified to restart the satisfaction of the predefined state sequence if it is not satisfied before or concurrently with the location of a predefined restart state condition. A restart on "any state" requires that the state sequence be satisfied without any unspecified intermediate states. For example, FIG. 2 illustrates the interactive trace specification display for a trace position starting upon the satisfaction of 4 state conditions in sequence. A restart state condition is also defined.

The selective trace is a qualification to determine which sampled states will be stored for display. One to seven state conditions may be "OR" specified for collection. Selectively tracing only sampled states of interest eliminates the clutter of unnecessary states and magnifies the apparent size of the trace beyond its 64 terms. Also, an occurrence term may be specified so as to store only every nth satisfaction of an "OR" specified state condition. FIG. 2 illustrates the selective trace of every occurrence of a single state condition.

The count measurement performs a "time" or a "state" count associated with each of the (64) states stored and can be displayed in one of two formats:
 absolute—the count from the trace position
 relative—the count from the previous trace state The time count is performed by counting the occurrences of an internal clock between sequentially stored states and the display is in the units of seconds. A state count similarly counts the number of occurrences of a specified state condition ("count") between sequentially stored states. For example, specifying "any state" would result in a count of the selected clock transitions of the input data. In FIG. 2, a state count is performed on the occurrences of a specified state condition intermediate to each sampled state stored.

INTERNAL MEASUREMENT STORAGE

One complete measurement of 64 sampled states, which includes the sampled states satisfying the state conditions defining the state sequence and specifications of the format, trace, and display, may be internally stored. This "current measurement" may be stored or exchanged with a "stored measurement" for later analysis. A "trace compare" mode of operation (described more fully below) compares results of a previously stored trace with the current measurement and may be utilized as a further qualifier on data storage.

DISPLAY SPECIFICATION

The output display format of the current measurement may be selected from a trace list, a trace graph, or a trace compare.

A trace list, illustrated in FIG. 3, displays a listing of the stored states in their order of occurrence. Twenty trace states, (one per line) are simultaneously presented on the CRT display. The "ROLL" keys allow scanning of the 64 stored states. Each line comprises a line number, the stored state alphabetically sorted into assigned labels in their numerical base, and the time or state count if selected.

Figures 4, 5:
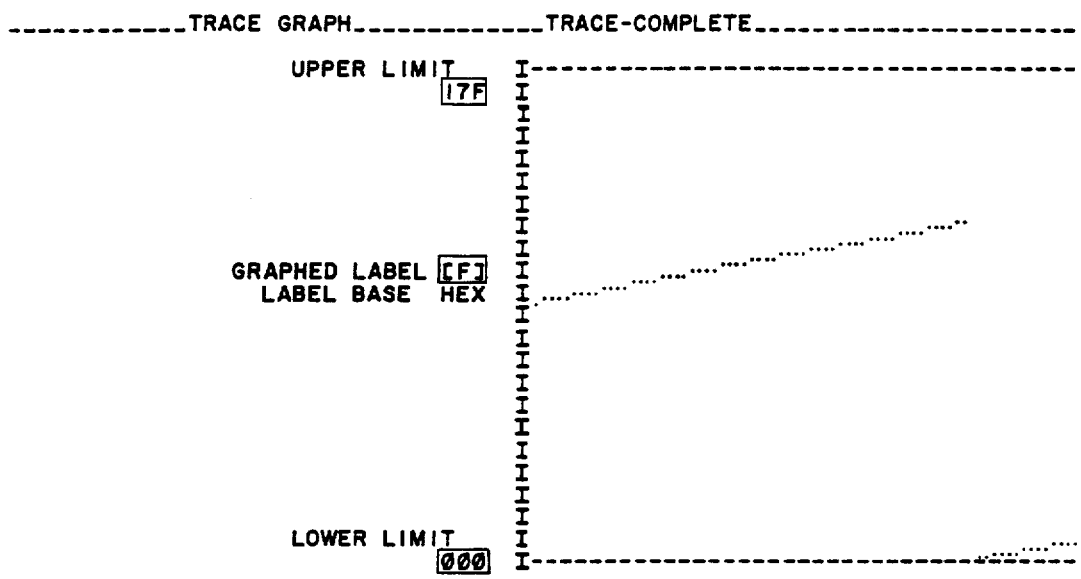
FIG. 4 illustrates a trace graph display of the stored data states.
FIG. 5 illustrates a trace compare output display list.

A trace graph, as shown in FIG. 4, presents a graph of the data magnitude of a specified label versus the storage location for all 64 stored states. Each state is given a vertical displacement corresponding to its binary magnitude and an increasing horizontal displacement for successive states in order of their occurrence. The result is a waveform analogous to oscilloscope displays of voltage magnitude. The label to be graphed is selected by specifying the "graphed label". Scaling of state magnitude is controlled by specifying the "upper limit" and "lower limit" on the vertical axis. Limits can be specified directly or dynamically varied with logrithmic autoranging controls. These facilities allow any portion of a graph to be magnified to a full scale presentation. The 20 points corresponding to the lines viewed in the trace list are intensified. The intensified portion also responds to the "ROLL" controls, and their corresponding absolute value may be read in the trace list.

A trace compare as illustrated in FIG. 5 presents a tabular listing of the difference between results in the "current measurement" and the data in the "stored measurement". The listing is formatted and rolled as in the trace list. The results of the two measurements are exclusive OR'ed such that identical corresponding bits are displayed as zeros and unequal bits are displayed as ones. In an octal base a "03" is equivalent to a binary "000 011" and indicates that the right two bits are different in the two measurements. Trace compare also offers a "compared trace" mode which reruns a measurement until the current and stored measurement are either equal or not equal. (STOP=, or STOP≠) For example, in FIG. 5 of the instrument has rerun trace measurements until the "current measurement" equaled the "stored measurement", as indicated by the "STOP=" specification and revealed by the array of "0"'s in the comparison.

TRACE MODES

Three trace mode options are provided. "Trace" executes a single current measurement. "Continuous trace" repeats the execution of a current measurement continuously. "Compared trace" repeats the execution of a current measurement until the desired comparison with the stored measurement is obtained.

CLOCK ENABLE AND TRIGGER OUTPUTS

A trigger output provides a triggering pulse for external instrumentation such as oscilloscopes. A 50 ns pulse is generated each time the trace position is found. The clock enable output is useful for gating clocks or interrupting the device under test. A high signal level indicates that the instrument is actively searching for the trace position. It remains at the high signal level until the trace position has been found or the halt key is depressed. Both outputs are suspended when the format specification is displayed to allow measurement of channel activity.

KEYBOARD AND SPECIFICATION DESIGNATION

Figure 6:
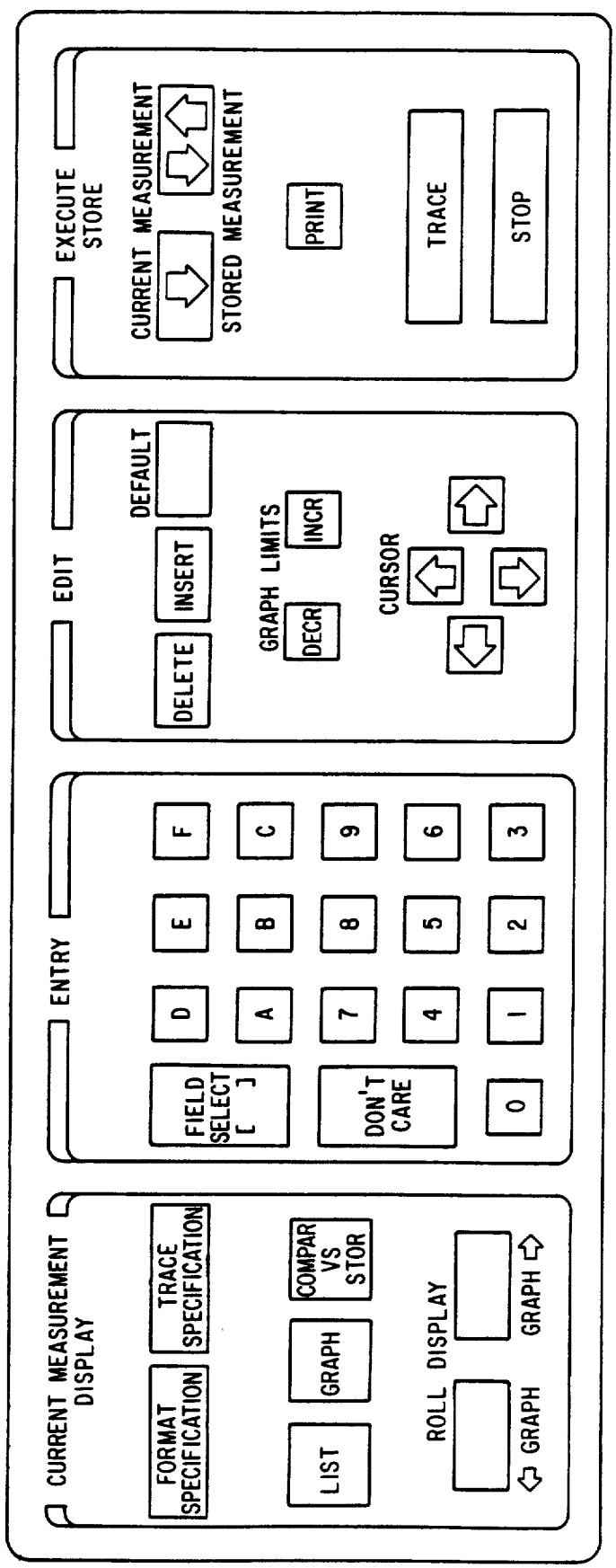
FIG. 6 illustrates the input keyboard.

Referring to FIG. 6, an illustration of the keyboard, the keys are functionally segregated into four blocks, the "current measurement display", "entry", "edit", and "execute". A power up sequence initially defines a default set of specifications, displays the default format specification, then automatically selects a hexadecimal trace list display. Activation of the "ROLL DISPLAY" keys permits the presentation of any portion of the 64 states stored. To change the format specification, the "FORMAT SPECIFICATION" key is pressed. The cursor keys in the edit block are used to move the cursor, designating a selectable entry field by a blinking inverse video field on the interactive display.

The trace specification can be edited by selecting the trace specification interactive display by activating the "trace specification" key. Editing is accomplished in the same manner as the format specification is edited. A general description of the functions of the individual keys is given in Appendix A. A detailed description of the interactive display entry fields is given in Appendix B.

DETAILED DESCRIPTION

Figure 7:
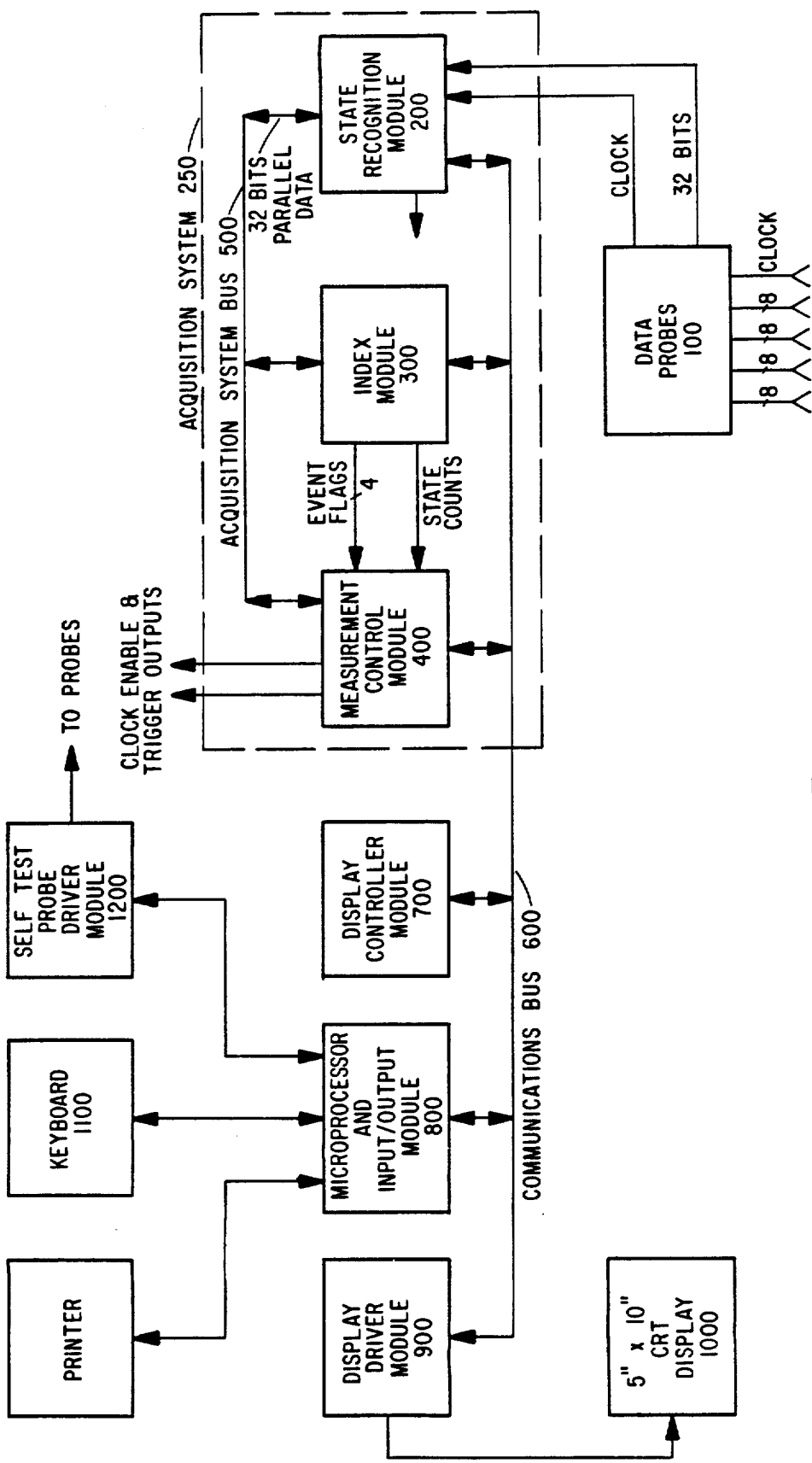
FIG. 7 illustrates a block diagram of the present invention.

Input states are sensed through 32 high impedance variable threshold data probes at rates up to 10 MHz. The data probes 100, illustrated in FIG. 7, are segmented into four 8 bit data pods and a fifth pod for clock sensing. Each pod may be preset to TTL logic threshold or variably adjusted in the range of +10 to −10 volts to interpret input logic levels.

The 32 input data channels and the clock signal from the data probes 100 are input to the state recognition module 200. An internal sampling clock is generated in response to the selected clock slope, the input data signals are compared to the selected threshold voltages and interpreted, and the data signals are latched in response to occurrences of the internal sampling clock. The state recognition module 200 outputs the sampled state to the high speed acquisition system bus 500. The index module 300 accesses the sampled state on the acquisition system bus 500, compares the sampled state to the selected state conditions and determines the trace position, selective storage events and state count events. The measurement control module 400 also accesses the acquisition system bus 500 and stores state or time counts and sampled data states in response to the events detected by the index module 300.

Figure 8:
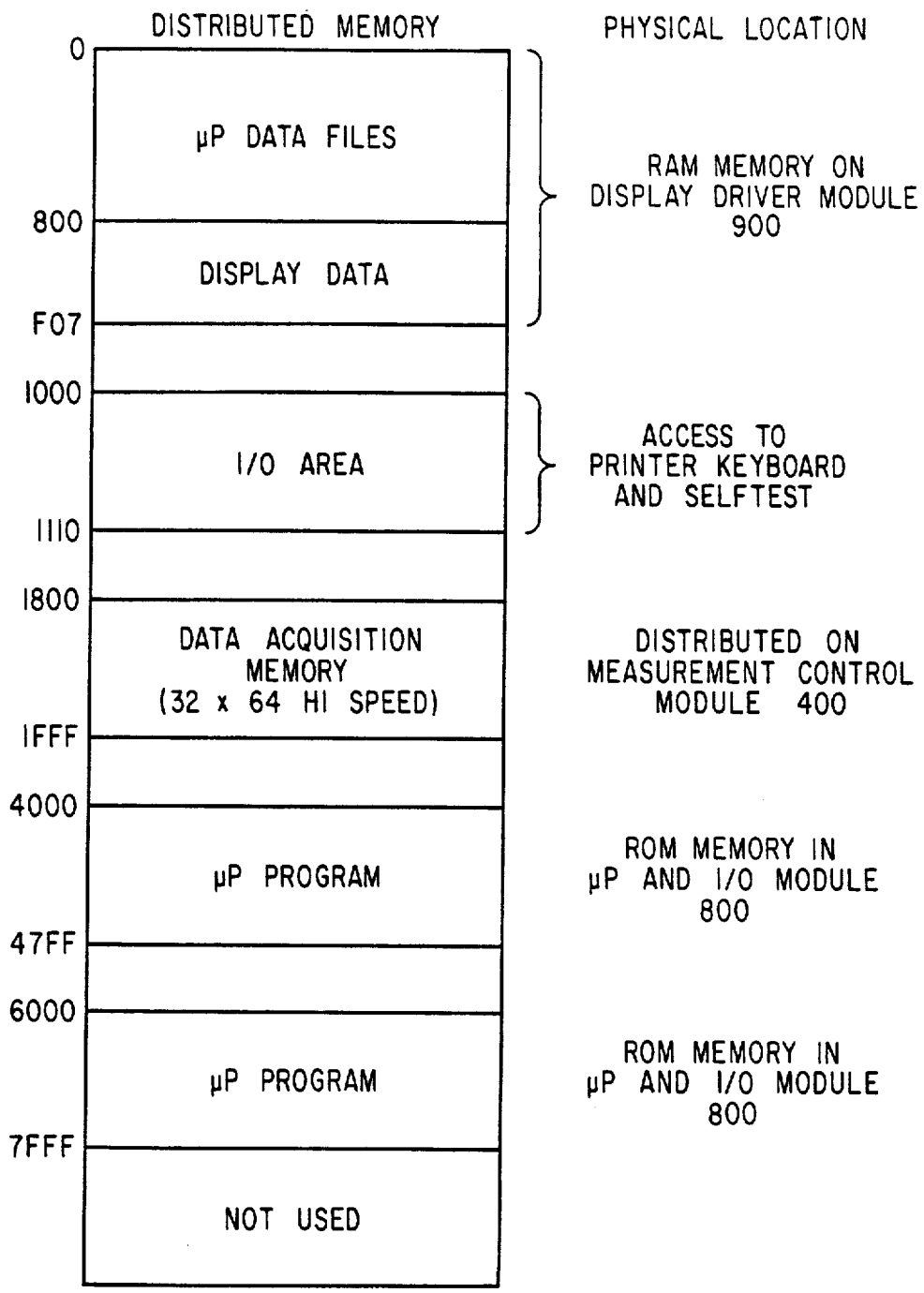
FIG. 8 illustrates the distributed memory addressing of the present invention.
Figure 9:
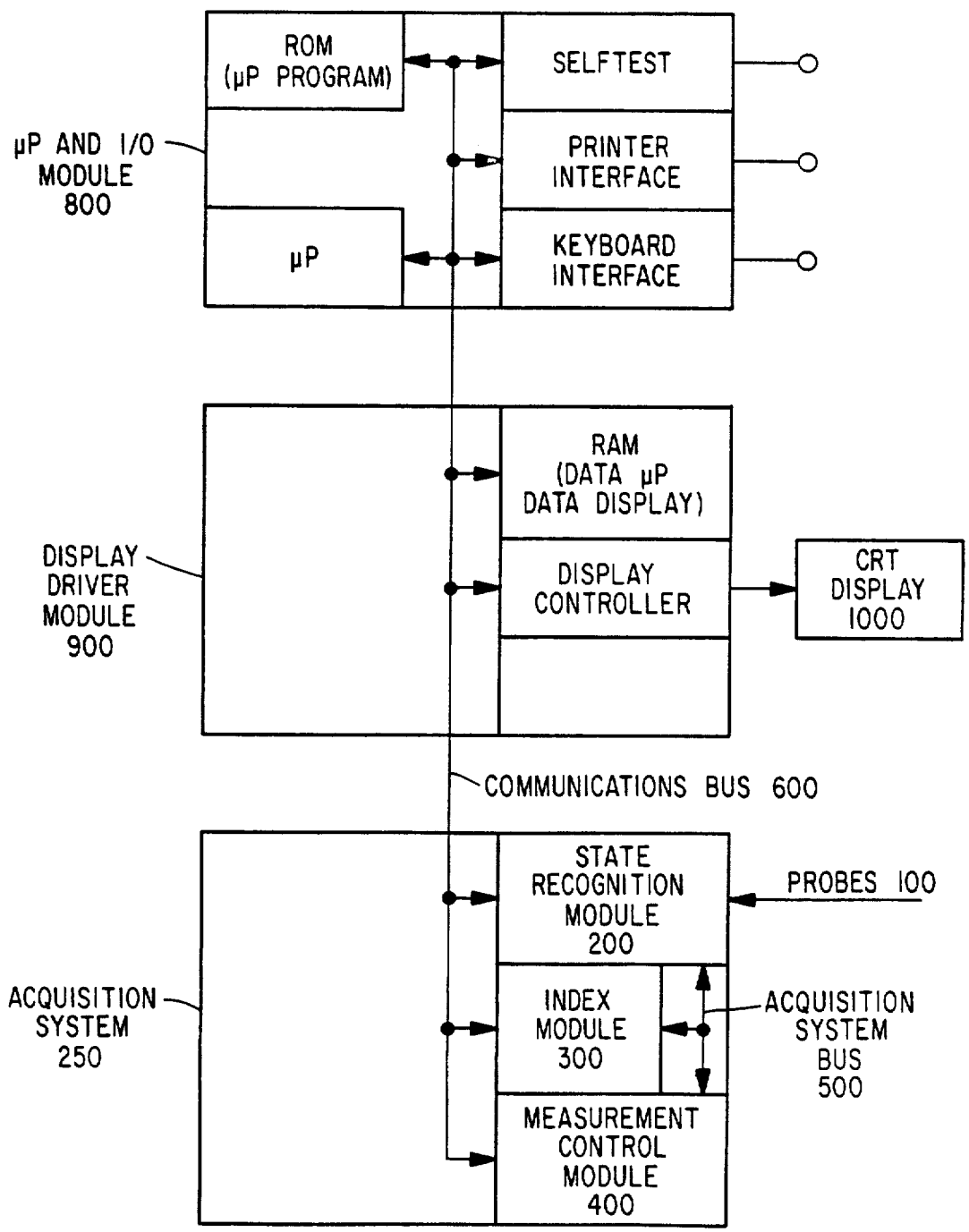
FIG. 9 illustrates the relationship between physical and logical addresses of the distributed memory of FIG. 8.

The modules of the acquisition system 250 communicate with other system modules via the communications bus 600, which provides a means for addressing selected modules and for transferring selected data. The entire system functions as a distributed memory, as illustrated in FIG. 8. For instance, addresses between 1800 and 1FFF on the communications bus 600 access the state count measurements and the sampled data states stored in the measurement control module 400 memories. FIG. 9 shows another representation of the system architecture, illustrating the relationship between the physical couplings of FIG. 7 and the logical addresses of FIG. 8.

Figure 10:
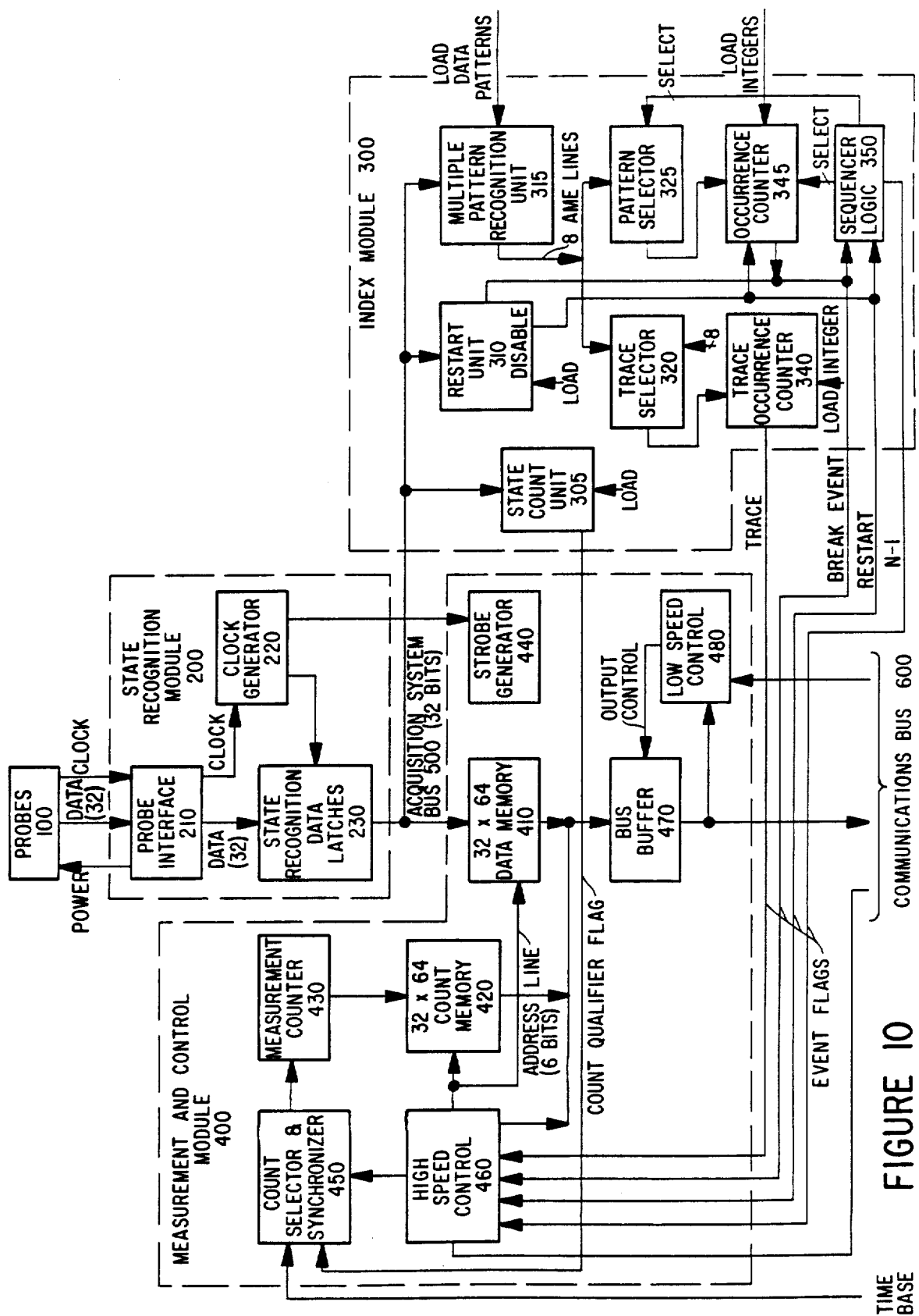
FIG. 10 is a block diagram of the acquisition system.
Figure 11:
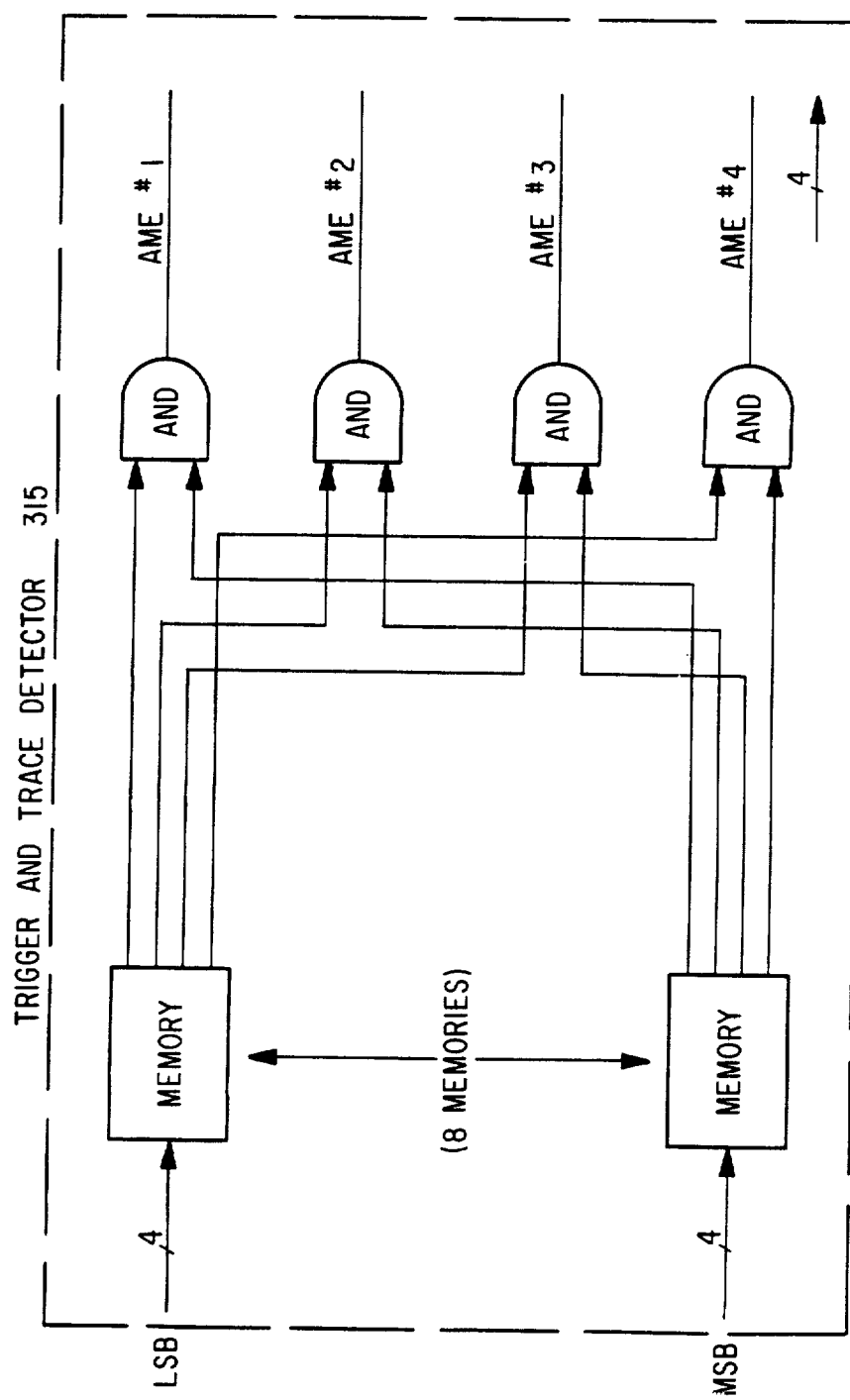
FIG. 11 illustrates a multiple pattern recognition unit.
Figure 12:
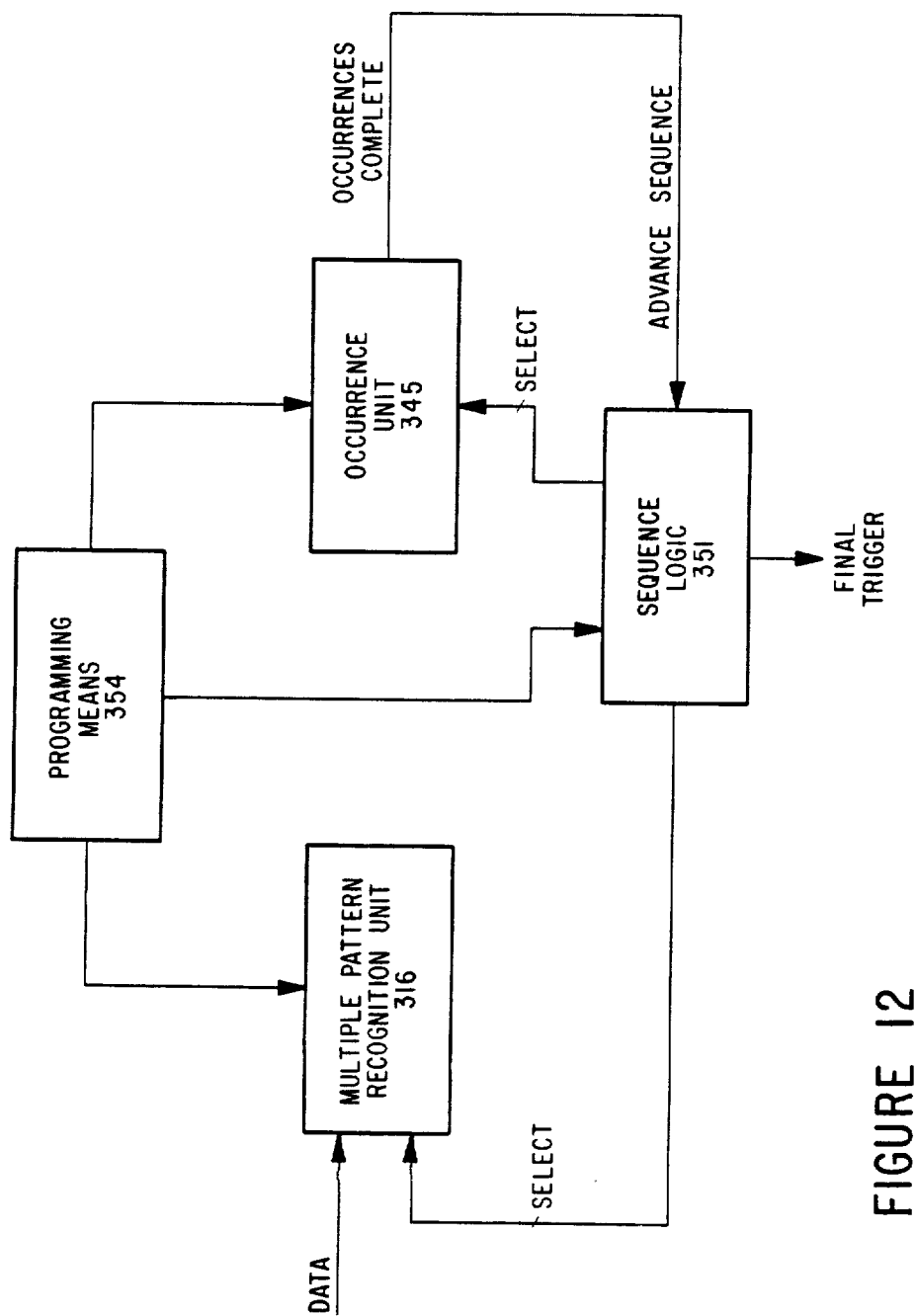
FIG. 12 illustrates a simplified sequential triggering circuit.

Referring to FIG. 10, the index module 300 detects the trace position by first comparing the sampled state on the acquisition system bus 500 with a qualifier state condition stored in the multiple pattern recognition unit 315. The multiple pattern recognition unit 315 comprises a digital pattern triggering circuit as described in the copending patent application entitled "DIGITAL PATTERN TRIGGERING CIRCUIT", U.S. patent application Ser. No. 743,188 filed Nov. 19, 1976, by WILLIAM A. FARNBACH now U.S. Pat. No. 4,100,532. As illustrated in FIG. 11, the multiple pattern recognition unit 315 comprises 2 pairs of 8 sixteen by four bit memories providing for the detection of up to eight qualifier state conditions, where each qualifier state condition is identified by a 1, 0, X input, format (in binary). Pattern selector 325 of FIG. 10 selects one of the eight lines output from the multiple pattern recognition unit and passes the selected output to the occurrence counter 345. The occurrence counter 345 counts the occurrences of the selected qualifier state conditions and provides an output in response to counting a specified number of occurrences of the selected qualifier state condition. This output is termed a "break event" and the sequencer logic 350 in response requests the pattern selector 325 to select the next sequential qualifier state condition and requests the occurrence counter 345 to select the corresponding count. The sequencer logic 350 also outputs a "N−1" event flag in response to detection of the occurrence of the "NEXT TO LAST BREAK EVENT". A simplified sequential triggering circuit is illustrated in FIG. 12 where the multiple pattern recognition unit 316 incorporates the functions of the multiple pattern recognition unit 315 and of the pattern selector 325. The sequence logic 351 incorporates the functions of the sequence logic 350 except that the final trigger is output in response to the completion of the state sequence. Another method of implementing the multiple pattern recognition unit 316 would be to have 3 selector bits be the most significant bits in the address, allowing the comparator to sequence through various segments of memory when comparing sequential state conditions of the state sequence.

Referring again to FIG. 10, the selective trace is incorporated in a similar manner except that the trace selector 320 of FIG. 10 can "OR" any combination of the AME lines. A trace occurrence counter 340 outputs a trace event flag upon counting each "nth" "ORED" AME event.

The restart unit 310 causes the sequence logic 350 to restart the satisfaction of the state sequence subsequent to the detection of a selected restart state condition. The restart unit is disabled for the data state corresponding to the detection of a break event by sequencer logic 350 which permits the state sequence to be satisfied without any unspecified intermediate state by setting the restart state condition to "any state".

The state count unit 305 strobes a counter in the measurement control module 400 each time the selected state condition to be counted is detected.

Figure 13:
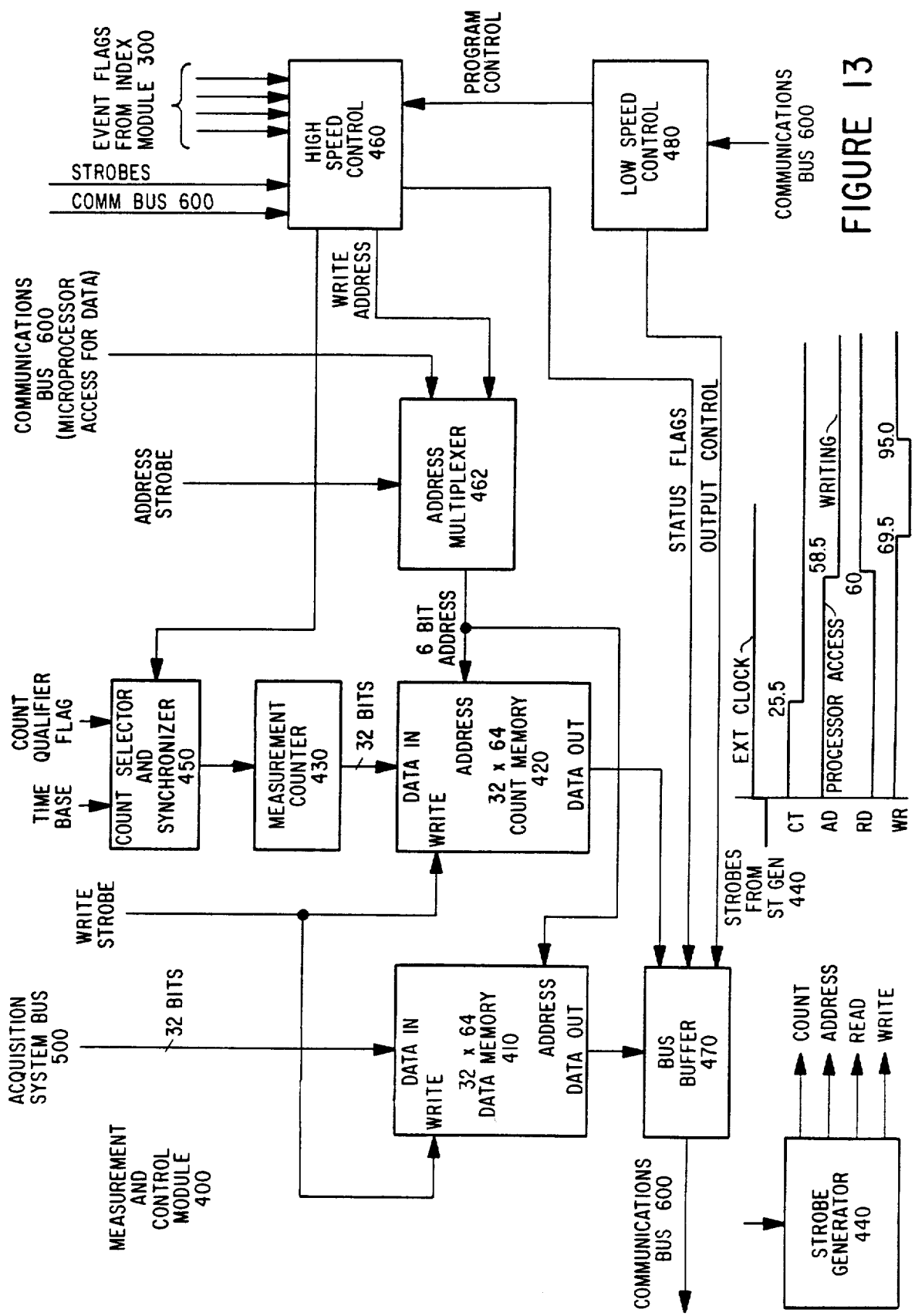
FIG. 13 illustrates the measurement and control module.
Figure 14:
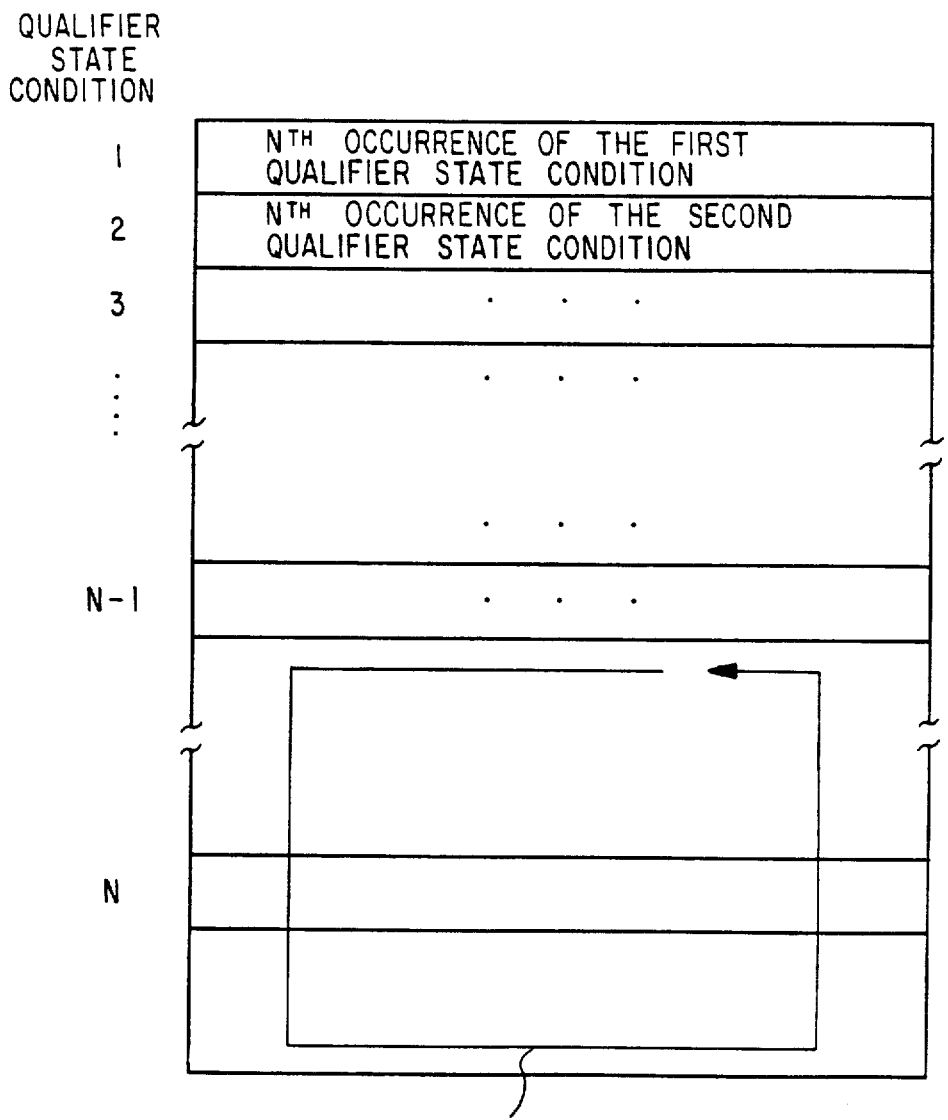
FIG. 14 illustrates the data format of the data memory.

The measurement and control module 400 is illustrated in FIGS. 10 and 13. The event flags from index module 300 are input to the high speed control 460 and determine which sampled states on the acquisition system bus 500 are to be stored. The high speed control 460 addresses the data memory 410 and the count memory 420 accordingly. FIG. 14 illustrates the data format of the data memory 410. The sampled state conditions resulting in break events are sequentially stored in locations 1−(N−1). Upon detection of the "N−1" event flag, sampled state conditions are sequentially written into the remaining memory locations, writing over the oldest data when the memory is filled. The trace position address of the memory location containing the state condition resulting in the final trigger is stored in a register and sampled states are written into the appropriate number of remaining storage locations. For example, if the trace was defined to end on the detection of the trace portion, no sampled states would be written subsequent to the detection of the trace position. The order of occurrence of the stored data is easily reconstructed by recovery of the trace position address appearing on the communications bus 600 as illustrated in FIG. 8. Count selector and synchronizer 450 controls the measurement counter 430, whose contents are stored in count memory 420 upon update of the memory address. The low speed control 480 provides a low speed interface for programming the high speed control 460 and for selecting and latching data for the communications bus 600 interface.

The strobe generator 400, illustrated in FIGS. 10 and 13, generates a sequence of strobes which, when coupled with a series of data latches (not shown) and timing logic (not shown) effectuate the orderly performance of machine tasks. In effect, a number of sampled states are simultaneously in various stages of processing at any one time and are "pipelined" through the required logic blocks.

APPENDIX A

| GENERAL DESCRIPTION-KEYBOARD | |
|---|---|
| CURRENT MEASUREMENT DISPLAY | |
| LINES 3 THROUGH 24 ARE DEPENDENT ON DISPLAYED MENU CHOSEN, | |
| WHICH MAYBE SELECTED BY KEYS IN CURRENT MEASUREMENT BLOCK: | |
| FORMAT SPECIFICATION | SELECT CLOCK SLOPE AND FORMAT 32 CHANNELS INTO LOGICAL LABELS AND DESIRED LOGIC POLARITY AND NUMERICAL BASE. |
| TRACE SPECIFICATION | DEFINE TRACE POSITION,SELECTIVE TRACE AND COUNT MEASUREMENT. |
| LIST | DISPLAY RESULTANT CURRENT TRACE AND COUNT DATA. |
| GRAPH | GRAPH RESULTANT CURRENT TRACE DATA FOR SELECTED LABEL.THE 2∅ INTENSIFIED DOTS CORRESPOND TO TRACE LIST DATA. |
| COMPARE VS STORE | DISPLAY "EXCLUSIVE OR" OF VALID CURRENT DATA WITH VALID STORED DATA,AND SELECT COMPARED TRACE MODE. |
| ROLL DISPLAY | VIEW TRACE LIST OR TRACE COMPARE DATA. TRACE GRAPH SHOWS INTENSIFIED DOTS THAT |
| GRAPH GRAPH ENTRY | REPRESENT THE TRACE LIST DATA DISPLAYED. |
| ALL PROGRAM ENTRIES ARE MADE IN INVERSE VIDEO FIELDS AT THE | |

APPENDIX A-continued
GENERAL DESCRIPTION-KEYBOARD

BLINKING CURSOR,AND MAYBE CHANGED BY ENTRY BLOCK OF KEYS:

| | |
|---|---|
| FIELD SELECT [ ] | ALL FIELDS ENCLOSED WITH BRACKETS [ ] ARE CHANGED BY THIS KEY. THE 1610A SELECTS ONLY ALLOWED CHOICES. |
| 0-G,A-F,X | ALL OTHER FIELDS MAYBE CHANGED USING THESE KEYS |

EDIT
DISPLAYED MENUS MAYBE EDITED BY EDIT BLOCK OF KEYS:

| | |
|---|---|
| DELETE INSERT | USED IN TRACE SPECIFICATION MENU ONLY TO OPTIONALLY DELETE OR INSERT STATES TO SPECIFY TRACE POSITION AND SELECTIVE TRACE.A MAXIMUM OF 8 STATES MAYBE USED BETWEEN TRACE POSITION AND SELECTIVE TRACE. |
| DEFAULT | RETURN DISPLAYED MENU TO KNOWN (PRESET, TRACEABLE) CONDITION. |
| INCR DECR | USED IN TRACE GRAPH ONLY TO AUTOMATICALLY CHANGE UPPER OR LOWER GRAPH LIMITS. TO MOVE BLINKING CURSOR TO DESIRED FIELD. |

EXECUTE
THE REMAINING KEYS ARE THE EXECUTE BLOCK OF KEYS:

| | |
|---|---|
| CURRENT MEASUREMENT | KEY SAVES CURRENT SPECIFICATION AND DATA MEASUREMENT IN A STORED FILE.THE |
| STORED MEASUREMENT | CURRENT SPECIFICATION AND DATA REMAINS UNCHANGED. KEY EXCHANGES CURRENT AND STORED MEASUREMENT FILES. |
| PRINT | PRINT CURRENT DISPLAY,EXCEPT TRACE GRAPH ON AN HP 9866 LINE PRINTER USING CONNECTOR ON REAR OF 1610A.TRACE LIST AND TRACE COMPARE WILL PRINT CURRENT PAGE AND ANY REMAINING DATA IN MEMORY. |
| TRACE | EXECUTES CURRENT SPECIFICATION,AND IF DISPLAY IS FORMAT SPECIFICATION OR TRACE SPECIFICATION,THE 1610A SWITCHES DISPLAY TO TRACE LIST. IF TRACE IS HELD DOWN,THE MEASUREMENT IS TRACED CONTINUOUSLY. IF COMPARE TRACE MODE IS SET FOR [STOP=] OR [STOP#] THE MEASUREMENT IS TRACED UNTIL COMPARED CONDITION IS MET.THE INSTRUMENT STATUS (1ST LINE) IS "COMPARED TRACE-FAILED",IMPLIES CONDITION NOT MET,OR "COMPARED TRACE-COMPLETE", IMPLIES CONDITION MET. |
| STOP | STOPS ANY MEASUREMENT TRACE,COMPARED TRACE OR PRINT IN PROCESS. |

APPENDIX B
DETAILED FIELD/S DESCRIPTION

CLOCK SLOPE:
EXAMPLES: CLOCK SLOPE [+]
CLOCK SLOPE [−]
PURPOSE: TO SELECT CLOCK TRANSITION TO STROBE POD DATA INTO 1610A.
LABEL ASSIGNMENT AND ACTIVE CHANNELS:
EXAMPLE:
```
         POD4            POD3            POD2            POD1
     7 ------- 0     7 ------- 0     7 ------- 0     7 ------- 0
     A A A A A A A A  A A A A A A A A  D D D D D D D D  X X X X X X X F
     1 1 1 1 1 1 1 1  1 1 1 1 1 1 1 1  1 1 1 1 1 1 1 1                 1
                              ACTIVE CHANNELS
```
PURPOSE: TO ASSIGN LABELS A,B,C,D,E OR F TO ANY NUMBER OF CONTINUOUS CHANNELS INDEPENDENT OF POD BOUNDARIES. IN THE ABOVE EXAMPLE THE LABEL A IS ASSIGNED TO 16 BITS OF POD3 AND POD4,AND MAY REPRESENT A 16 BIT ADDRESS.LABEL D IS ASSIGNED 8 BITS ON POD2 AND MAY REPRESENT AND 8 BIT DATA BLS. LABEL F IS ASSIGNED TO BE A SINGLE BIT QUALIFIER (READ, WRITE) AND IS ASSIGNED TO LEAST SIGNIFICANT BIT ON POD1.
ANY UNUSED CHANNELS MAYBE TURNED OFF BY PUTTING A "X" IN GIVEN CHANNELS.
COMMENT: AS MANY AS SIX LABELS OR AS FEW AS ONE MAYBE ASSIGNED ACROSS THE 32 CHANNELS. IF A LABEL IS SPLIT, SUCH AS
  AABBBAAA   (LABEL IS NOT CONTINUOUS)
THEN AN ERROR MESSAGE "ERROR-SPLIT LABEL" IS DISPLAYED AND THE CURSOR IS LOCKED TO LABEL ASSIGNMENT FIELDS UNTIL THE ERROR IS CORRECTED.

APPENDIX B-continued

DETAILED FIELD/S DESCRIPTION

PRESSING DEFAULT KEY WILL ASSIGN LABEL F TO ALL 32 CHANNELS.
ACTIVE CHANNELS ARE SHOWN BY "↑" MARKS FOR EACH ASSIGNED CHANNEL. ABSENCE OF "↑" INDICATE LOW CHANNEL(BIT) ACTIVITY,AND ARE GOOD INDICATORS OF POD CLIPS THAT MAY HAVE FALLEN OFF. CHANNEL ACTIVITY IS NOT DISPLAYED WHILE 1610A IS TRACEING.
IF POD IS CONNECTED TO DATA PORT ON REAR OF 1610A, THE CHANNEL ACTIVITY "↑" FOR LEAST SIGNIFICANT 2 BITS IS NOT SHOWN (DUE TO SYNCHRONOUS 8 BIT COUNT AND 1610A).

LOGIC POLARITY:
EXAMPLE:    LABEL              A    D    F
            LOGIC POLARITY    [−]  [−]  [+]
            (+,−)
PURPOSE:    TO SELECT A LOGIC POLARITY FOR EACH ASSIGNED LABEL.

NUMERICAL BASE:
EXAMPLE:    LABEL             A     B     F
            NUMERICAL BASE   [HEX] [OCT] [BIN]
            (BIN,OCT DEC,HEX)
PURPOSE:    TO SELECT A NUMERICAL BASE TO BE HEXIDECIMAL(HEX), OCTAL(OCT),DECIMAL(DEC),OR BINARY(BIN) FOR EACH ASSIGNED LABEL.

TRACE POSITION:
EXAMPLE:    [START ] TRACE
            [CENTER] TRACE
            [END ] TRACE
PURPOSE:    TO SELECT TRACE POSITION TO BE SOME GIVEN STATE AND ITS POSITION IN RESULTANT DATA TRACE FILE SHOULD BE AT [START] FOLLOWED BY SELECTIVE TRACE STATES,OR AT [CENTER] SHOWING ANY SELECTIVE STATES BEFORE AND AFTER "CENTER STATE",OR AT [END] SHOWING ANY SELECTIVE STATES BEFORE THE "END STATE".
EXAMPLE:    LABEL              A      OCCUR
            BASE              HEX    DEC
            FIND IN SEQUENCE   10    00001
            THEN               20    00001
            THEN               30    00005
            [START ] TRACE     40    00001
            SEQ.RESTART [ON]   50
COMMENT:    THIS EXAMPLE HAS THE FOLLOWING MEANING FOR DEFINING TRACE POSITION:
            FIND IN SEQUENCE 00001 OCCURANCE OF STATE 10,THEN THE 00001 OCCURANCE OF STATE 20, THEN THE 00005 OCCURANCE OF STATE 30,AND [START] TRACE AT 00001 OCCURANCE OF STATE 40.
            IF DURING THIS SEQUENCE THE RESTART STATE 50 IS ENCOUNTERED BEFORE REACHING THE 00001 OCCURANCE OF STATE 40,THE MEASUREMENT RESTARTS,TO FIND IN SEQUENCE THE 00001 OCCURANCE OF STATE 10,THEN 00001 OCCURANCE OF STATE 20 ETC.
            NOTE: IF A SEQUENCE STATE IS DEFINED TO BE THE SAME AS THE RESTART STATE,THE SEQUENCE STATE DOMINATES.
            IF [CENTER] OR [END] WERE SELECTED,SELECTIVE TRACE STARTS AT COMPLETION OF 5 OCCURANCES OF STATE 30 (SEE SELECTIVE TRACE).

SELECTIVE TRACE:
EXAMPLE:    LABEL              A      OCCUR
            [ALL STATES]
PURPOSE:    TO TRACE ALL STATES.
EXAMPLE:    LABEL              A      OCCUR
            BASE              HEX    DEC
            TRACE
            [ONLY STATE]       60    00001
            OR                 7X
            OR                 8X
PURPOSE:    TO SELECTIVELY TRACE DESIRED STATES.
COMMENTS:   THE ABOVE EXAMPLE HAS FOLLOWING MEANING:
            DO A SIMULTANEOUS TRACE OF 00001 OCCURANCE OF STATES 60 OR 7X (70 TO 7F) OR 8X (80 TO 8F).

COUNT:
EXAMPLE:    LABEL              A
            BASE              HEX
            COUNT [ OFF ]
            COUNT [STATE]      7X
            COUNT [TIME ]
PURPOSE:    TO SELECT COUNT MEASUREMENT TO BE [OFF],OR COUNT [STATE] OR COUNT [TIME].
COMMENT:    WHEN COUNT IS [OFF], THE TRACE LIST DOES NOT SHOW COUNT DATA FOR THE NEXT TRACE MEASUREMENT.

APPENDIX B-continued
DETAILED FIELD/S DESCRIPTION

WHEN COUNT [STATE] IS SELECTED, A 32 BIT COUNT OF SELECTED STATE 7X (7∅ TO 7F) IS STORED IN MEMORY WITH EACH POD DATA STATE STORED. THE RESULTANT COUNT DATA IS DISPLAYED IN TRACE LIST FOR NEXT TRACE MEASUREMENT.

WHEN COUNT (TIME) IS SELECTED, A COUNT VALUE OF TIME IS STORED FOR EACH POD DATA STATE STORED IN MEMORY. THE RESULTANT TIME DATA IN DISPLAYED IN TRACE LIST FOR NEXT TRACE MEASUREMENT.

STATE COUNT OR TIME [ABS],[REL]:

EXAMPLE:

| LABEL | A | STATE COUNT |
|---|---|---|
| BASE | HEX | DEC [ABS] |
| SEQUENCE | 1∅ | − 1∅43 |
| SEQUENCE | 2∅ | − 1∅33 |
| SEQUENCE | 3∅ | − 1∅23 |
| START | 4∅ | ∅ |
| +∅1 | 6∅ | + 2∅ |
| +∅2 | 7∅ | + 3∅ |
| +∅3 | 71 | + 31 |

| LABEL | A | STATE COUNT |
|---|---|---|
| BASE | HEX | DEC [REL] |
| SEQUENCE | 1∅ | |
| SEQUENCE | 2∅ | 1∅ |
| SEQUENCE | 3∅ | 2∅ |
| START | 4∅ | 1∅23 |
| +∅1 | 6∅ | 2∅ |
| +∅2 | 7∅ | 1∅ |
| +∅3 | 71 | 1 |

| LABEL | A | TIME |
|---|---|---|
| BASE | HEX | DEC [ABS] |
| SEQUENCE | 1∅ | − 2∅8.3 US |
| SEQUENCE | 2∅ | − 2∅∅.2 US |
| SEQUENCE | 3∅ | − 185.1 US |
| START | 4∅ | .∅ US |
| +∅1 | 6∅ | + 8∅.∅ US |
| +∅2 | 7∅ | + 12∅.9 MS |
| +∅3 | 71 | + 122.5 MS |

PURPOSE: TO VIEW TRACE LIST AND SELECT [ABS] OR [REL] FOR STATE COUNT OR TIME DATA.

COMMENTS: WHEN ABSOLUTE [ABS] IS SELECTED THEN STATE COUNT OR TIME IS DISPLAYED IN +/− ABSOLUTE VALUES WITH RESPECT. TO START STATE 4∅. ALL STATES BEFORE START STATE 4∅ ARE SHOWN WITH "−" COUNT VALUES. START STATE 4∅ IS SHOWN AS ALWAYS ∅. ALL STATES SHOWN AFTER START STATE 4∅ ARE SHOWN WITH "+" COUNT VALUES.

WHEN RELATIVE [REL] IS SELECTED, THEN STATE COUNT OR TIME IS DISPLAYED SHOWING COUNT VALUES RELATIVE TO PREVIOUS STATE COUNT VALUE (IF VALID) WITHOUT SIGN.

GRAPHED LABEL:
EXAMPLE:
GRAPHED LABEL [A]
GRAPHED LABEL [F]

PURPOSE: TO SELECT A DEFINED LABEL A,B,C,D,E OR F TO BE GRAPHED.

UPPER/LOWER LIMITS:
EXAMPLE:
UPPER LIMIT
177
LOWER LIMIT
∅∅∅

PURPOSE: TO CHANGE UPPER OR LOWER GRAPH LIMITS.

COMMENT: GRAPH LIMITS MAYBE CHANGED USING ENTRY KEYS OR THE LIMITS MAYBE AUTOMATICALLY INCREMENTED OR DECREMENTED USING INCR OR DECR KEYS IN EDIT BLOCK.
THE UPPER LIMIT MUST BE GREATER THAN LOWER LIMIT, ELSE AN "ERROR-OVERLAPPING LIMITS" IS DISPLAYED AND GRAPH DOTS ARE NOT DISPLAYED.

COMPARED TRACE MODE:
EXAMPLE:

| LABEL | A | COMPARED |
|---|---|---|
| BASE | HEX | TRACE MODE [OFF] |
| SEQUENCE | ∅∅ | |

APPENDIX B-continued

DETAILED FIELD/S DESCRIPTION

|  |  |  |  |
|---|---|---|---|
|  | SEQUENCE | ØØ |  |
|  | SEQUENCE | ØØ |  |
|  | START | ØØ |  |
|  | +Ø1 | 3Ø |  |
|  | +Ø2 | ØØ |  |
| PURPOSE: | TO SHOW THE "EXCLUSIVE OR" OF CURRENT DATA WITH STORED DATA. ALL Ø'S IMPLIES SAME DATA IN BOTH FILES AND NON Ø'S (3Ø) SHOWS THAT DATA STATE DOES NOT COMPARE (BITS 4 AND 5, ASSUMING LSB IS BIT Ø). | | |
| EXAMPLE: | LABEL | A | COMPARED |
|  | BASE | HEX | TRACE MODE [STOP=] |
|  | LABEL | A | COMPARED |
|  | BASE | HEX | TRACE MODE [STOP#] |
| PURPOSE: | TO SELECT COMPARED TRACE MODE TO BE STOP WHEN EQUAL [STOP=],OR STOP WHEN NOT EQUAL [STOP#]. | | |
| COMMENTS: | WHEN [STOP=] IS CHOSEN THE MEASUREMENT IS TRACED UNTIL VALID CURRENT DATA EQUALS (=) VALID STORED DATA.THE STATUS OF INSTRUMENT WILL BE: "COMPARED TRACE-FAILED" WHICH MEANS CURRENT DATA DOES NOT EQUAL STORED DATA.THE 161ØA THEN TRACES AGAIN SHOWING: "COMPARED TRACE-IN PROCESS" AND COMPARES ANOTHER SET OF DATA. THIS PROCESS CONTINUES UNTIL: "COMPARED TRACE-COMPLETE" WHICH MEANS VALID CURRENT FILE EQUALS VALID STORED FILE DATA. A SIMILIAR OPERATION EXISTS FOR [STOP#],EXCEPT THIS MEASUREMENT CONTINUES UNTIL FILES DO NOT COMPARE. NOTE: THIS IS NOT A REAL TIME MEASUREMENT,BUT RATHER A "SAMPLED COMPARED MODE" THAT IS DEPENDENT IN PART UPON DATA CLOCK RATES,TRACE SPECIFICATION. THIS MEASUREMENT MODE MUST BE TURNED [OFF] TO OBTAIN SINGLE OR CONTINUOUS TRACE MODE. | | |

We claim:

1. Apparatus for selecting, storing and displaying a set of logic states occurring in a collection of digital signals, the apparatus comprising:

first control means for designating a selected sequence of logic states $SS_1, \ldots, SS_n$;

second control means for designating a selected logic state as a trigger state;

input means coupled to receive the collection of digital signals for performing signal conditioning thereon according to preselected thresholds to produce a collection of conditioned logic signals;

sequence detection means coupled to at least the collection of conditioned logic signals and to the first and second control means for producing a trigger signal upon the occurrence of the trigger state subsequent to the occurrence of the state $SS_n$, whose occurrence is in turn subsequent to its predecessor, and so on, subsequent to the occurrence of the state $SS_1$, storage means coupled to at least the collection of conditioned logic signals and to the trigger signal for storing logic states occurring in the collection of conditioned logic signals until a preselected number of logic states have been stored subsequent to the occurrence of the trigger signal; and display means coupled to the storage means for displaying an indication of the logic states stored therein.

2. Apparatus as in claim 1 wherein the storage means has m-many locations and includes means for retaining the most recent m-many logic states stored therein by overwriting the least recently stored logic states therein once m-many logic states have been stored, and further comprising third control means for designating as an integer k in the range of $o \leq k \leq m$ the preselected number recited in connection with the storage means, and wherein the storage means is responsive to the third control means by storing k-many logic states following the occurrence of the trigger signal.

3. Apparatus as in claim 1 further comprising third control means for designating a selected plurality of logic states as qualifier states, qualifier state detection means coupled to the third control means and to the collection of conditioned logic signals for producing a qualifier signal upon only an occurrence of any qualifier state, and wherein the storage means is responsive to the qualifier signal by storing only those logic states producing the qualifier signal.

4. Apparatus as in claim 1 wherein the first control means additionally includes means for designating one or more separate occurrence integers $J_1$ through $J_n$ respectively associated with the logic states $SS_1$ through $SS_n$ and wherein the sequence detection means is additionally responsive to the occurrence integers by requiring the logic state $SS_1$ to occur $J_1$ times, and so on, before the logic state $SS_n$ subsequently occurs $J_n$ times, in order to produce the trigger signal upon a subsequent occurrence of the trigger state.

5. Apparatus as in claim 1 further comprising third control means for designating a selected logic state as a restart state, restart state detection means coupled to the third control means and to the collection of conditioned logic signals for producing a restart signal upon the occurrence of the restart state, and wherein the sequence detection means is additionally responsive to the restart signal by nullifying any partial satisfaction of the sequence of logic states and requiring the sequence detection activity to begin afresh with $SS_1$.

6. A method of triggering logic state analysis apparatus that can be coupled to a collection of digital signals wherein logic states occur and that is of the type that collects a preselected number of those logic states subsequent to a triggering of the apparatus, the method comprising the steps of:
  entering into the logic state analysis apparatus a sequence of selected logic states;
  entering into the logic state analysis apparatus a selected logic state designated as a trigger state;
  detecting in the collection of digital signals at least an occurrence of the first logic state in the sequence, and only then detecting in the collection of digital signals a subsequent occurrence of the next logic state in the sequence, and so on until each logic state in the sequence has been detected; and only then
  triggering the logic state analysis apparatus upon detecting in the collection of digital signals a subsequent occurrence of the logic state designated as the trigger state.

7. A method as in claim 6 further comprising the step of specifying that the detection in the collection of digital signals of a logic state in the sequence must occur at least n-many times before a subsequent occurrence in the collection of digital signals of the next logic state in the sequence can be detected.

8. A method as in claim 6 further comprising the steps of designating a selected logic state as a restart state, detecting in the collection of digital signals an occurrence of the restart state, and wherein upon such detection the step of detecting in the collection of digital signals the various selected logic states in the sequence thereof begins again with the first logic state therein.

* * * * *

UNITED STATES PATENT AND TRADEMARK OFFICE
CERTIFICATE OF CORRECTION

PATENT NO. : 4,495,599

DATED : January 22, 1985

INVENTOR(S) : Haag, George A.; Fogg, O. Douglas; Greenley, Gordon A.; Shepard, Steve A.; Terry, F. Duncan It is certified that error appears in the above-identified patent and that said Letters Patent is hereby corrected as shown below:

Column 3, line 51, "lebel" should read --label--

Column 5, line 49, " "stored measurement" should read -- "stored measurement" --

In the Claims

Claim 1, Column 15, line 53, "$SS_1$," should read --$SS_1$;--

Signed and Sealed this

Tenth Day of September 1985

[SEAL]

Attest:

DONALD J. QUIGG

Attesting Officer

Acting Commissioner of Patents and Trademarks - Designate